United States Patent
Liang et al.

(10) Patent No.: US 10,098,166 B2
(45) Date of Patent: Oct. 9, 2018

(54) METHOD AND DEVICE FOR WIRELESS CONNECTION ESTABLISHMENT

(71) Applicant: Xiaomi Inc., Beijing (CN)

(72) Inventors: Xin Liang, Beijing (CN); Yi Ru, Beijing (CN); Guizhou Wu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/381,407

(22) Filed: Dec. 16, 2016

(65) Prior Publication Data
US 2017/0188397 A1  Jun. 29, 2017

(30) Foreign Application Priority Data
Dec. 24, 2015  (CN) .......................... 2015 1 0991861

(51) Int. Cl.
| | |
|---|---|
| *H04J 1/16* | (2006.01) |
| *H04W 76/10* | (2018.01) |
| *H04W 76/02* | (2009.01) |
| *H04L 29/08* | (2006.01) |
| *H04W 24/08* | (2009.01) |
| *H04W 72/04* | (2009.01) |
| *H04W 72/08* | (2009.01) |
| *H04W 88/02* | (2009.01) |

(52) U.S. Cl.
CPC ......... *H04W 76/10* (2018.02); *H04L 67/1046* (2013.01); *H04L 67/1061* (2013.01); *H04W 24/08* (2013.01); *H04W 72/0453* (2013.01); *H04W 72/085* (2013.01); *H04W 76/02* (2013.01); *H04W 88/02* (2013.01)

(58) Field of Classification Search
CPC . H04W 76/02; H04W 24/08; H04W 72/0453; H04W 72/085; H04W 88/02; H04L 67/1046; H04L 67/1061
USPC ........................................................ 370/252
See application file for complete search history.

(56) References Cited

U.S. PATENT DOCUMENTS

| | | | |
|---|---|---|---|
| 8,929,822 B2 | 1/2015 | Jung et al. | |
| 9,258,768 B2 | 2/2016 | Jung et al. | |
| 9,602,996 B2 * | 3/2017 | Seo ........ | H04J 11/005 |
| 2013/0036231 A1 | 2/2013 | Suumäki | |

(Continued)

FOREIGN PATENT DOCUMENTS

| | | |
|---|---|---|
| CN | 102812772 A | 12/2012 |
| CN | 104468675 A | 3/2015 |

(Continued)

OTHER PUBLICATIONS

Extended Search Report for European Application No. 16196799.7 from the European Patent Office, dated Apr. 25, 2017.

(Continued)

*Primary Examiner* — Peter Cheng
(74) *Attorney, Agent, or Firm* — Finnegan, Henderson, Farabow, Garrett & Dunner LLP (57) ABSTRACT

A method includes: monitoring a plurality of wireless working frequency bands supported by a smart terminal; when a Peer to Peer (P2P) data packet is received at any of the wireless working frequency bands, analyzing the P2P data packet and obtaining device information of a smart device; and establishing a wireless connection with the smart device at the wireless working frequency band according to the device information.

7 Claims, 7 Drawing Sheets

(56) References Cited

U.S. PATENT DOCUMENTS

| | | | |
|---|---|---|---|
| 2013/0065627 A1 | 3/2013 | Jung et al. | |
| 2014/0235238 A1* | 8/2014 | Pais | H04W 76/043 455/434 |
| 2015/0105023 A1 | 4/2015 | Jung et al. | |
| 2015/0271823 A1 | 9/2015 | Gao | |
| 2015/0382252 A1* | 12/2015 | Yu | H04W 8/005 370/331 |
| 2016/0157289 A1 | 6/2016 | Jung et al. | |
| 2016/0210105 A1 | 7/2016 | Ru et al. | |

FOREIGN PATENT DOCUMENTS

| | | |
|---|---|---|
| CN | 104580401 A | 4/2015 |
| CN | 104657099 A | 5/2015 |
| CN | 105472778 A | 4/2016 |
| EP | 2 849 412 A1 | 3/2015 |
| EP | 3 038 397 A1 | 6/2016 |
| EP | 3 046 309 A1 | 7/2016 |

OTHER PUBLICATIONS

International Search Report in International Application No. PCT/CN2016/090299, dated Oct. 11, 2016.
Office Action in counterpart Chinese Application No. 201510991861.5, dated May 8, 2018.

* cited by examiner

METHOD AND DEVICE FOR WIRELESS CONNECTION ESTABLISHMENT

CROSS-REFERENCE TO RELATED APPLICATIONS

This application is based upon and claims priority to Chinese Patent Application No. 201510991861.5, filed on Dec. 24, 2015, the entire contents of which are incorporated herein by reference.

TECHNICAL FIELD

The present disclosure generally relates to the technical field of wireless networks and, more particularly, to a method and device for establishing a wireless connection.

BACKGROUND

Along with development of wireless network technologies, the Wireless Fidelity Peer to Peer (WiFi P2P) protocol specification released by the WiFi alliance supports formation of a P2P network including a plurality of WiFi devices, i.e., a P2P group, so that the WiFi devices may communicate with each other when there is no Access Point (AP). For example, a smart phone supporting the WiFi P2P protocol may directly establish a wireless connection with a smart television supporting the WiFi P2P protocol, and transmit screen data, media resources and the like of the smart phone to the smart television through the established wireless connection, to be displayed or played on the smart television.

In the related art, establishment of a wireless connection between WiFi devices supporting the WiFi P2P protocol includes two steps: a device discovery step and a P2P group establishment step. For example, to establish a wireless connection between a smart television and a smart phone, the smart television needs to start a specified application program configured for WiFi P2P connection, broadcast a probe-request data packet on channels 1, 6, and 11 at a 2.4 GHz frequency band through the specified application program, and then monitor probe-request data packets transmitted from other devices on a randomly selected frequency band. The smart phone uses the same manner of broadcasting and monitoring. The device discovery step is completed when the smart television and the smart phone respectively detect the probe request data packets sent by each other on frequency bands that they monitor. The smart television and the smart phone also send data packets to each other to negotiate about establishment of a P2P group and determine a group owner and a group client to complete the connection process.

SUMMARY

According to one aspect of the present disclosure, there is provided a method for establishing a wireless connection. The method includes: acquiring a current wireless working frequency band of a smart device; and periodically broadcasting a Peer to Peer (P2P) data packet on the current wireless working frequency band, wherein the P2P data packet at least includes device information of the smart device for a smart terminal to establish a wireless connection with the smart device according to the device information.

According to another aspect of the present disclosure, there is provided a method for establishing a wireless connection. The method includes: monitoring a plurality of wireless working frequency bands supported by a smart terminal; when a Peer to Peer (P2P) data packet is received at any of the wireless working frequency bands, analyzing the P2P data packet and obtaining device information of a smart device; and establishing a wireless connection with the smart device at the wireless working frequency band according to the device information.

According to another aspect of the present disclosure, there is provided a smart device. The smart device includes: a processor and a memory configured to store instructions executable by the processor. The processor is configured to: acquire a current wireless working frequency band of the smart device; and periodically broadcast a Peer to Peer (P2P) data packet on the current wireless working frequency band, wherein the P2P data packet at least includes device information of the smart device for a smart terminal to establish a wireless connection with the smart device according to the device information.

According to another aspect of the present disclosure, there is provided a smart terminal. The smart terminal includes: a processor and a memory configured to store instructions executable by the processor. The processor is configured to: monitor a plurality of wireless working frequency bands supported by the smart terminal; when a Peer to Peer (P2P) data packet is received at any of the wireless working frequency bands, analyze the P2P data packet and obtain device information of a smart device; and establish a wireless connection with the smart device at the wireless working frequency band according to the device information.

According to another aspect of the present disclosure, there is provided a non-transitory computer-readable storage medium having stored therein instructions that, when executed by a processor of a smart device, cause the smart device to perform a method for establishing a wireless connection. The method includes: acquiring a current wireless working frequency band of the smart device; and periodically broadcasting a Peer to Peer (P2P) data packet on the current wireless working frequency band, wherein the P2P data packet at least includes device information of the smart device for a smart terminal to establish a wireless connection with the smart device according to the device information.

According to another aspect of the present disclosure, there is provided a non-transitory computer-readable storage medium having stored therein instructions that, when executed by a processor of a smart terminal, cause the smart terminal to perform a method for establishing a wireless connection. The method includes: monitoring a plurality of wireless working frequency bands supported by the smart terminal; when a Peer to Peer (P2P) data packet is received at any of the wireless working frequency bands, analyzing the P2P data packet and obtaining device information of a smart device; and establishing a wireless connection with the smart device at the wireless working frequency band according to the device information.

It is to be understood that both the foregoing general descriptions and the following detailed descriptions are exemplary and explanatory only and are not restrictive of the present disclosure.

BRIEF DESCRIPTION OF THE DRAWINGS

The accompanying drawings, which are incorporated in and constitute a part of this specification, illustrate embodi

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Figure 1A:
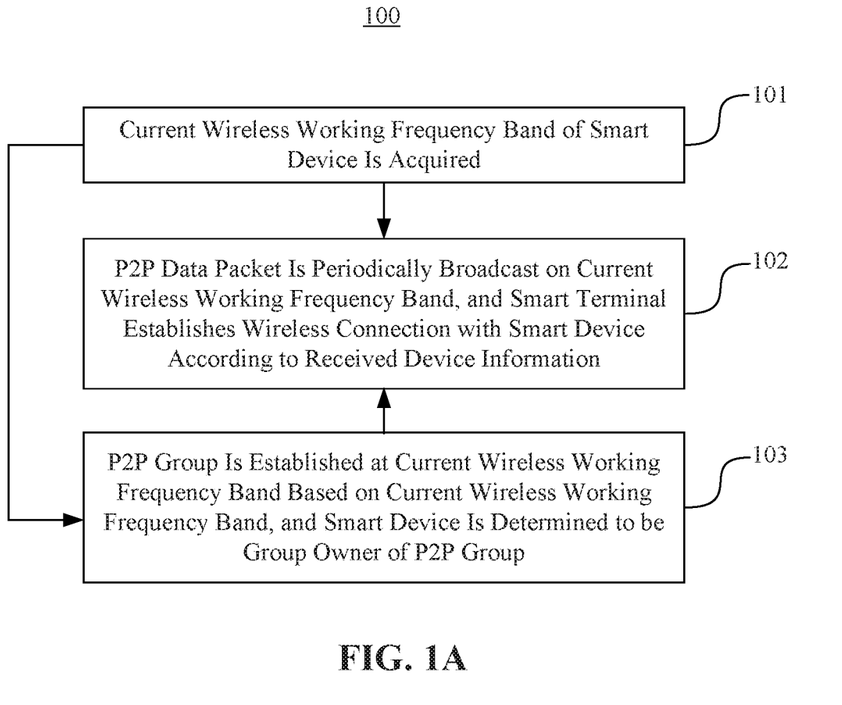
- FIG. 1A is a flow chart showing a method for establishing a wireless connection, consistent with embodiments of the present disclosure.

FIG. 1A is a flow chart showing a method 100 for establishing a wireless connection, according to an exemplary embodiment. The method 100 may be performed by a smart device. As shown in FIG. 1A, the method 100 includes the following steps.

In step 101, a current wireless working frequency band of the smart device is acquired.

In step 102, a P2P data packet is periodically broadcast on the current wireless working frequency band so that a smart terminal establishes a wireless connection with the smart device according to device information of the smart device included in the P2P data packet.

In the illustrated embodiment, the P2P data packet at least includes the device information of the smart device.

In the illustrated embodiment, the current wireless working frequency band of the smart device is acquired; and the P2P data packet is periodically broadcast on the current wireless working frequency band. The P2P data packet at least includes the device information of the smart device, and the smart terminal may establish a wireless connection with the smart device according to the received device information. Since the current wireless working frequency band where the P2P data packet is broadcast by the smart device is at the same frequency band where the smart device conducts other WiFi services, broadcasting the P2P data packet may not need frequent handovers among channels 1, 6 and 11. This reduces impacts of broadcasting the P2P data packet on normal use of the other WiFi services.

In some embodiments, the method 100 further includes step 103 after step 101. In step 103, a P2P group is established at the current wireless working frequency band based on the current wireless working frequency band, and the smart device is determined to be a group owner of the P2P group.

In some embodiments, the P2P data packet further includes identification information of the P2P group, and the smart terminal joins the P2P group according to the received device information and the identification information of the P2P group.

In some embodiments, a P2P data packet is a beacon data packet.

Figure 1B:
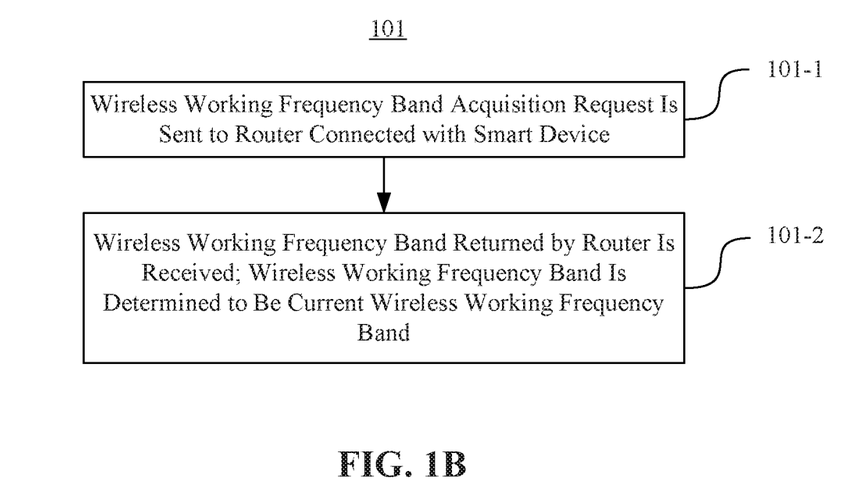
FIG. 1B is a flow chart showing steps in step 101 shown in FIG. 1A, consistent with embodiments of the present disclosure.

In some embodiments, referring to FIG. 1B, the step 101 includes the following steps.

In step 101-1, a wireless working frequency band acquisition request is sent to a router connected with the smart device.

In step 101-2, a wireless working frequency band returned by the router is received. The wireless working frequency band is determined to be the current wireless working frequency band.

In some embodiments, the technical solutions explained in the above embodiments may be freely combined.

Figure 2A:
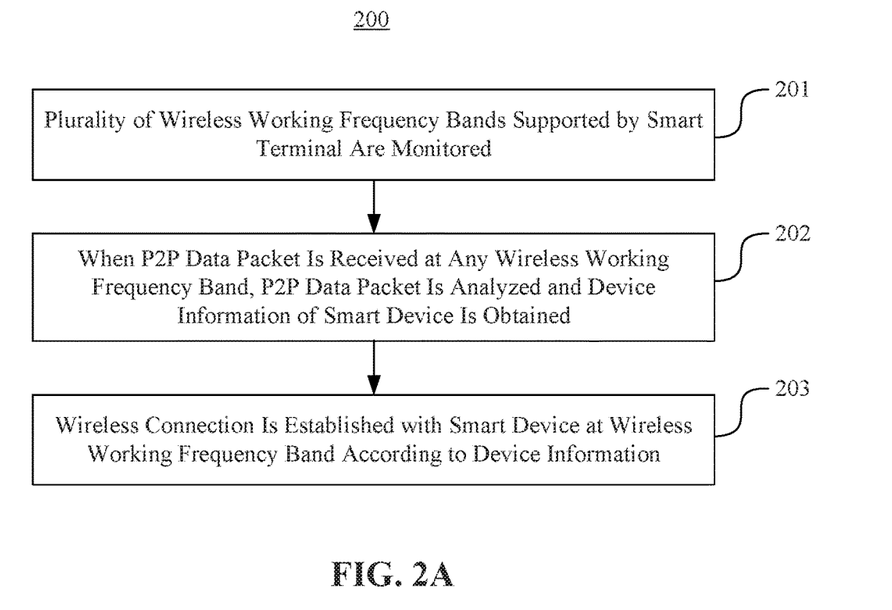
FIG. 2A is a flow chart showing another method for establishing a wireless connection, consistent with embodiments of the present disclosure.

FIG. 2A is a flow chart showing another method 200 for establishing a wireless connection, according to an exemplary embodiment. For example, the method 200 may be performed by a smart terminal. As shown in FIG. 2A, the method 200 includes the following steps.

In step 201, a plurality of wireless working frequency bands supported by a smart terminal are monitored.

In step 202, when a P2P data packet is received at any wireless working frequency band, the P2P data packet is analyzed and device information of a smart device is obtained.

In step 203, a wireless connection is established with the smart device at the wireless working frequency band according to the device information.

In the illustrated embodiment, the plurality of wireless working frequency bands supported by the smart terminal are monitored. When the P2P data packet is received at any wireless working frequency band, the P2P data packet is analyzed and the device information of the smart device is obtained. The wireless connection is established between the smart device and the smart terminal at the wireless working frequency band according to the device information. Since the smart terminal may monitor P2P data packets at all of its supported wireless working frequency bands and establish the wireless connection with the smart device at the wireless working frequency band where the P2P data packet sent by the smart device is received, the smart device may not frequently switch among channels 1, 6, and 11 for broadcasting. This reduces influence of broadcasting the P2P data packet on normal use of the other WiFi services.

Figure 2B:
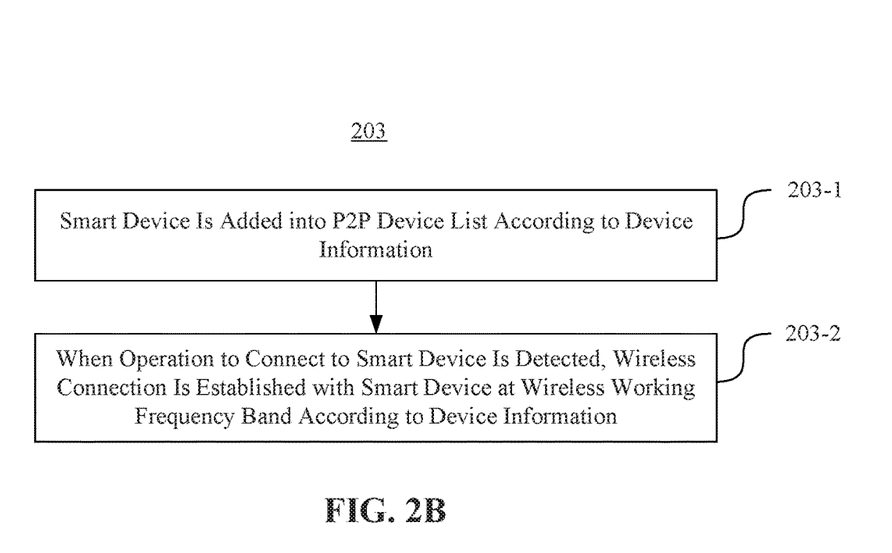
FIG. 2B is a flow chart showing steps in step 203 shown in FIG. 2A, consistent with embodiments of the present disclosure.

In some embodiments, referring to FIG. 2B, step 203 may include the following steps.

In step 203-1, the smart device is added into a P2P device list according to the device information.

In step 203-2, when an operation to connect to the smart device is detected, the wireless connection is established with the smart device at the wireless working frequency band according to the device information.

Figure 2C:
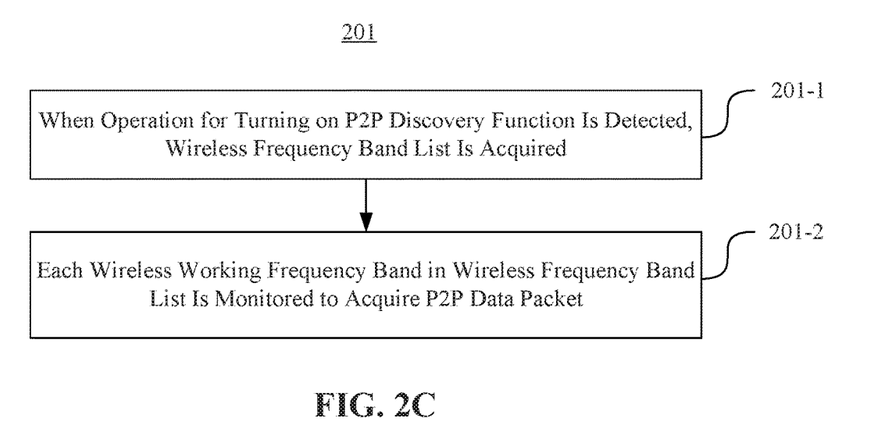
FIG. 2C is a flow chart showing steps in step 201 shown in FIG. 2A, consistent with embodiments of the present disclosure.

In some embodiments, referring to FIG. 2C, step 201 may include the following steps.

In step 201-1, when an operation for turning on a P2P discovery function is detected, a wireless frequency band list is acquired. The wireless frequency band list includes the plurality of wireless working frequency bands supported by the smart terminal.

In step 201-2, each wireless working frequency band in the wireless frequency band list is monitored to acquire the P2P data packet.

In some embodiments, the method 200 further includes the following operations.

In step 202, the P2P data packet is analyzed to further obtain identification information of a P2P group.

In step 203, when the operation to connect to the smart device is detected, the smart terminal joins the P2P group according to the device information and the identification information of the P2P group.

In some embodiments, the technical solutions explained in the above embodiments may be freely combined.

Figure 3:
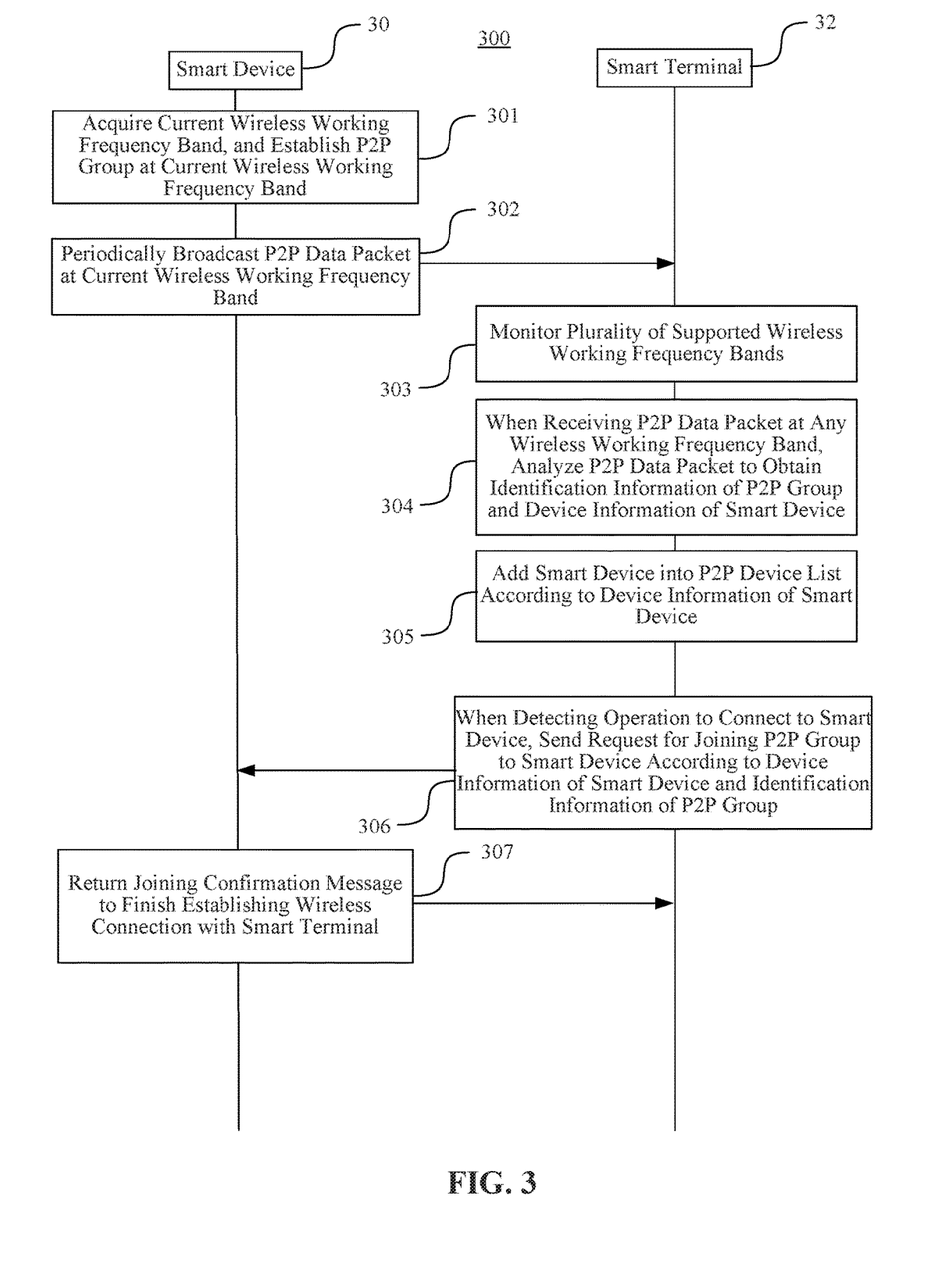
FIG. 3 is a flow chart showing still another method for establishing a wireless connection, consistent with embodiments of the present disclosure.

FIG. 3 is a flow chart showing still another method 300 for establishing a wireless connection, according to an exemplary embodiment. The method 300 may be performed by a smart device 30 and a smart terminal 32. As shown in FIG. 3, the method 300 includes the following steps.

In step 301, the smart device 30 acquires its own current wireless working frequency band, and establishes a P2P group at the current wireless working frequency band.

In the illustrated embodiment, the smart device 30 has a WiFi function to connect to a router, and may acquire resource such as audio or video data from the Internet through the router. Under a normal condition, the router may keep working at a wireless working frequency band without changes, and the smart device 30, together with the router, is using the same wireless working frequency band after being connected to the router. The smart device 30 further supports the WiFi P2P protocol, and is configured to establish a wireless connection with another WiFi device supporting the WiFi P2P protocol, so that the smart device 30 may establish a wireless connection with another WiFi device without the router. That is, the smart device 30 may form a P2P group with said another WiFi device. In some embodiments, the smart device 30 may be a smart television, said another WiFi device may be a smart terminal 32, such as a smart phone or a tablet computer. But the present disclosure is not limited to these devices.

In one embodiment, if said another WiFi device is a smart terminal 32, the smart device 30 acquires its own current wireless working frequency band before establishing the wireless connection with the smart terminal 32. For example, a wireless working frequency band acquisition request is sent to the router connected with the smart device 30. A wireless working frequency band returned by the router is received and determined to be the current wireless working frequency band. For example, the wireless working frequency band may be a 2.4G frequency band, a 5G frequency band, and the like, which is not limited in the embodiment of the present disclosure.

In another embodiment, the smart device 30 may further directly acquire its own current working frequency band. For example, related configuration information of a wireless port may be detected to acquire the current working frequency band. Other methods of acquiring the current working frequency band may be employed and the present disclosure is not limited to the examples explained above.

In some embodiments, a P2P group formed by different WiFi devices through a WiFi P2P protocol includes a group owner and at least one group client. In one embodiment, the group client may send screen data, media resource or the like to the group owner to display or play. For example, the media resource may include one or more of text, a picture, a video, an audio and the like, which is not specifically limited in the embodiment of the present disclosure. Some WiFi devices may serve as group owners according to demands of users under normal conditions. A WiFi device usually serving as a group owner in a P2P group may establish a P2P group designating the WiFi device itself as the group owner before the WiFi device establishes a wireless connection with another WiFi device. For example, a user may send screen data of a smart terminal to a smart television to be displayed in the smart television. The smart television, during wireless connection of the smart television and the smart terminal, may form a P2P group and make itself as the group owner before establishing a connection with the smart terminal. The smart terminal may directly join the P2P group as a group client to simplify an establishment process of the wireless connection.

In the illustrated embodiment, after acquiring the current wireless working frequency band, the smart device 30 establishes a P2P group at the current wireless working frequency band based on the current wireless working frequency band, and serves as a group owner of the P2P group. In one embodiment, if the current wireless working frequency band of the smart device is 5,220 MHz, the smart device 30 may establish a P2P group at the 5,220 MHz wireless working frequency band by virtue of a command "P2P_GROUP_ADD persistent freq=5220", and the establisher, the smart device 30, of the P2P group is determined to be the group owner by default, wherein "persistent" represents that a persistent P2P group is established. In a persistent P2P group, a smart terminal only needs to join the P2P group once, and the smart terminal may directly perform data transmission with the smart device 30 through stored connection information in the future.

In the illustrated embodiment, the smart terminal 32 may directly join the P2P group without negotiating with the smart device 30 to establish a P2P group after receiving a P2P data packet from the smart device 30, because the smart device 30 establishes the P2P group before establishing a wireless connection with the smart terminal 32, so that the establishment process of the wireless connection is simplified.

In step 302, the smart device 30 periodically broadcasts a P2P data packet at the current wireless working frequency band.

In the illustrated embodiment, the smart device 30 does not broadcast a probe request data packet using channels 1, 6 and 11, but periodically broadcast the P2P data packet at the current wireless working frequency band. This may avoid having the smart device 30 to perform frequent handover on other WiFi services of the smart device among channels 1, 6 and 11 at the 2.4G frequency band while establishing the wireless connection with another wireless device, which may lead to poor user experiences caused by, for example, lowered transmission rate of said other WiFi services or affecting the normal use of said other WiFi services. In some embodiments, the P2P data packet is a beacon data packet. The P2P data packet may include device information of the smart device 30 and identification information of the P2P group. In one embodiment, the device information of the smart device 30 includes a Media Access Control (MAC) address of the smart device 30, a name of the smart device 30 and the like, which is not limited in the embodiment of the present disclosure. The identification information of the P2P group at least includes a Service Set Identifier (SSID) of the P2P group. In some embodiments, the P2P data packet may include P2P Information Element (IE) information, such as a P2P identifier and a transmission rate supported by the smart device 30. The P2P identifier is configured to indicate that the P2P data packet is consistent with the WiFi P2P protocol. In some embodiments, when starting a specified application program (such as Miracast) configured for WiFi P2P connection, a smart device may also broadcast a probe request data packet using channels 1, 6, and 11, as in the related art.

In another embodiment, the smart device 30 may periodically broadcast the P2P data packet at the current wireless working frequency band to avoid adverse influence on other WiFi services due to frequent handovers of the smart device among channels 1, 6, and 11 at the 2.4G frequency band during the establishment of the wireless connection after the smart device 30 acquires its own current wireless working frequency band. After the P2P data packet is broadcast, subsequently, the smart device 30 and the smart terminal 32 may negotiate about establishment of the P2P group. In some embodiments, the P2P data packet at least includes the device information of the smart device 30 so that the smart terminal 32 may establish the wireless connection with the smart device according to the received device information. In some embodiments, the P2P data packet may also include the P2P IE information, such as the P2P identifier and the transmission rate of the smart device 30, which is not limited in the embodiment of the present disclosure.

In step 303, the smart terminal 32 monitors a plurality of wireless working frequency bands supported by the smart terminal 32.

In the illustrated embodiment, the smart terminal 32 may not only monitor probe request data packets on channels 1, 6 and 11 at the 2.4G frequency band, but also monitor P2P data packets at all wireless working frequency bands supported by the smart terminal 32. That is, the smart terminal 32 may monitor a plurality of wireless working frequency bands supported by the smart terminal.

For example, when an operation for turning on a P2P discovery function is detected, a wireless frequency band list is acquired. The wireless frequency band list includes the plurality of wireless working frequency bands supported by the smart terminal 32. Each wireless working frequency band in the wireless frequency band list is monitored to acquire the P2P data packet.

In step 304, when the smart terminal 32 receives the P2P data packet at any wireless working frequency band, the P2P data packet is analyzed to obtain identification information of the P2P group and device information of the smart device.

In the illustrated embodiment, when receiving the P2P data packet at any wireless working frequency band in the wireless frequency band list supported by the smart terminal 32, the smart terminal 32 analyzes the P2P data packet and obtains the identification information of the P2P group and the device information of the smart device. The smart terminal 32 determines that the P2P data packet is consistent with the WiFi P2P protocol based on the P2P identifier in the P2P data packet. In some embodiments, the smart terminal 32 analyzes the P2P data packet to obtain the Service Set Identifier (SSID) of the P2P group and the device information such as the MAC address and the name of the smart device 30. In addition, the smart terminal 32 may also read information from the P2P data packet about the wireless working frequency band, i.e. the current wireless working frequency band of the smart device 30, for establishing wireless connection with the smart device 30.

In some embodiments, the P2P data packet sent by the smart device 30 may further include the current wireless working frequency band of the smart device 30. The smart terminal 32 analyzes the P2P data packet to acquire the current wireless working frequency band of the smart device 30.

In another embodiment, when the smart device 30 does not establish a P2P group after acquiring its own current wireless working frequency band and when the smart terminal 32 receives the P2P data packet at any wireless working frequency band, the P2P data packet is analyzed to obtain the device information of the smart device 30. The smart terminal 32 establishes the wireless connection with the smart device 30 at the wireless working frequency band according to the device information. In the illustrated embodiment, the wireless working frequency band is consistent with the current wireless working frequency band on which the smart device 30 sends the P2P data packet. That is, if the smart device 30 sends the P2P data packet at the 5,220 MHz frequency band, the smart terminal 32 may receive the P2P data packet from the smart device 30 at the 5,220 MHz frequency band.

In step 305, the smart terminal 32 adds the smart device 30 into a P2P device list according to the device information of the smart device 30.

In some embodiments, the smart terminal 32 may provide a P2P device interface for a user. A device list, which is named the P2P device list in the embodiment of the present disclosure and includes WiFi devices discovered by the smart terminal 32 or WiFi devices with which the smart terminal 32 have established wireless connections, is displayed in the P2P device interface. The smart terminal 32 adds not only WiFi devices discovered at a specific P2P frequency band but also WiFi devices detected at other wireless working frequency bands supported by the smart terminal 32 into the P2P device list. When said other WiFi devices detected at said other wireless working frequency bands supported by the smart terminal 32 are added into the P2P device list, the current wireless working frequency bands where said other WiFi devices are detected are added to the list.

In the illustrated embodiment, the WiFi devices are all devices supporting the WiFi P2P protocol, and wireless connection refers to WiFi P2P protocol-based wireless connection. The smart terminal 32 may display a wireless connection not established based on the WiFi P2P protocol or a discovered device not supporting the WiFi P2P protocol in an ordinary wireless device list. For any device in the P2P device list, when an operation to connect to the device is detected, the smart terminal 32 establishes a wireless connection with the device based on the WiFi P2P protocol, and the method 300 proceeds to step 306.

In step 306, when detecting an operation to connect to the smart device 30, the smart terminal 32 sends a request for joining a P2P group to the smart device 30 according to the device information of the smart device 30 and the identification information of the P2P group.

In the embodiment of the present disclosure, when the operation to connect to the smart device 30 in the P2P device list of the smart terminal 32 is detected, the smart terminal 32 joins the P2P group according to the device information of the smart device 30 and the identification information of the P2P group. For example, the smart terminal 32 acquires the device information of the smart device 30, the identification information of the P2P group, and wireless working frequency band information of the smart device 30. The smart terminal 32 sends the request for joining a P2P group to the smart device 30 at the wireless working frequency band indicated by the wireless working frequency band information. The request for joining a P2P group includes the device information of the smart device 30 and the identification information of the P2P group. When receiving a joining confirmation message returned by the smart device 30 according to the request for joining a P2P group, the smart terminal 32 successfully joins the P2P group to establish the wireless connection with the smart device 30.

In some embodiments, the smart device 30 does not establish a P2P group after acquiring its own current wireless working frequency band. When an operation to connect to the smart device 30 is detected, the smart terminal 32 may establish the wireless connection with the smart device 30 at the wireless working frequency band according to the device information of the smart device 30. In the illustrated embodiment, the smart terminal 32 and the smart device 30 may send data packets to each other to negotiate with each other to establish a P2P group and determine a group owner and a group client. The wireless connection between the smart terminal 32 and the smart device 30 is established when they form the P2P group.

In step 307, the smart device 30 returns a joining confirmation message to finish establishing a wireless connection with the smart terminal 32 after receiving the request for joining a P2P group.

In some embodiments, the smart device 30 acquires the identification information of the P2P group in the request for joining a P2P group, determines whether the acquired identification information of the P2P group matches with the identification information of its own P2P group. If they match, the smart device 30 returns a joining confirmation message to finish establishing the wireless connection with the smart terminal 32.

When the smart device 30 determines that the acquired identification information of the P2P group does not match with the identification information of its own P2P group, the smart device 30 returns a joining refusal message to the smart terminal 32 or does not perform any operation. The smart terminal determines that the wireless connection to the smart device 30 fails after it receives the joining refusal message, or when the smart terminal 32 does not receive any feedback message within a predetermined time period. In some embodiments, the predetermined time period may be 50 milliseconds, 100 milliseconds, 150 milliseconds, and the like, which is not limited in the embodiment of the present disclosure.

According to the methods provided by the embodiments of the present disclosure, the smart device 30 acquires its current wireless working frequency band, and periodically broadcasts a P2P data packet on the current wireless working frequency band. The P2P data packet at least includes the device information of the smart device 30. The smart terminal 32 establishes the wireless connection with the smart device 30 according to the received device information. Since the current wireless working frequency band at which the P2P data packet is broadcast by the smart device 30 is the same frequency band of other WiFi services on the smart device 30, the broadcasting reduces frequent handovers among channels 1, 6, and 11, and impacts on normal use of other WiFi services can be minimized. Moreover, since the smart device 30 set up a P2P group before establishing the wireless connection with the smart terminal 32, the smart terminal 30 may simply join the P2P group without negotiating with the smart device 30 to form a P2P group after receiving the P2P data packet of the smart device 30. This simplifies the wireless connection establishment process.

Figure 4:
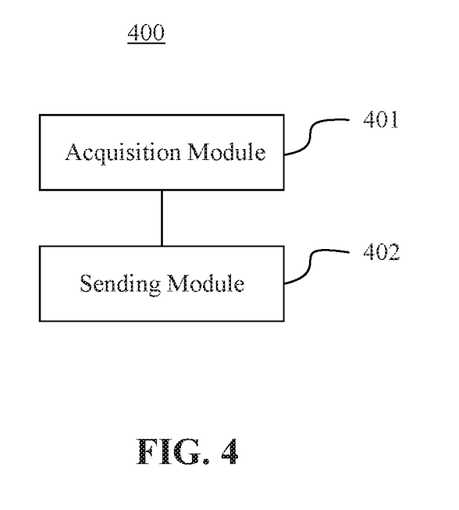
FIG. 4 is a block diagram of a device for establishing a wireless connection, consistent with embodiments of the present disclosure.

FIG. 4 is a block diagram of a device 400 for establishing a wireless connection, according to an exemplary embodiment. For example, device 400 may be a smart device, such as smart device 30 shown in FIG. 3. Referring to FIG. 4, the device 400 includes an acquisition module 401 and a sending module 402.

The acquisition module 401 is coupled with the sending module 402, and is configured to acquire a current wireless working frequency band of a smart device. The sending module 402 is configured to periodically broadcast a P2P data packet through the current wireless working frequency band. The P2P data packet at least includes device information of the smart device for establishing a wireless connection between the smart device and a smart terminal.

Figure 5:
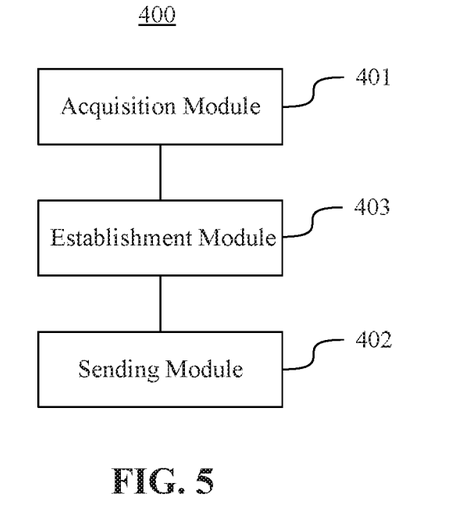
FIG. 5 is a block diagram of another device for establishing a wireless connection, consistent with embodiments of the present disclosure.

In some embodiments, referring to FIG. 5, the device 400 further includes an establishment module 403, configured to set up a P2P group at the current wireless working frequency band based on the current wireless working frequency band, and determine the smart device as a group owner of the P2P group.

In some embodiments, the P2P data packet further includes identification information of the P2P group so that the smart terminal may join the P2P group according to the received device information and the identification information of the P2P group.

In some embodiments, the P2P data packet is a beacon data packet.

In some embodiments, the acquisition module 401 is configured to send a wireless working frequency band acquisition request to a router connected with the smart device, receive a wireless working frequency band returned by the router, and determine the returned wireless working frequency band as the current wireless working frequency band.

In the illustrated embodiment, the current wireless working frequency band of the smart device is acquired; and the P2P data packet is periodically broadcast on the current wireless working frequency band. The P2P data packet at least includes the device information of the smart device so that the smart terminal may establish the wireless connection with the smart device according to the received device information. Since the current wireless working frequency band where the P2P data packet is broadcast by the smart device is at the same frequency band where the smart device conducts other WiFi services, broadcasting the P2P data packet may not need frequent handovers among channels 1, 6 and 11. This reduces impacts of broadcasting the P2P data packet on normal use of the other WiFi services.

Figure 6:
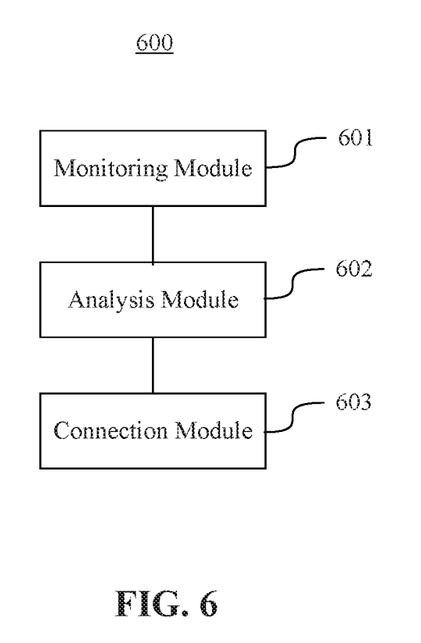
FIG. 6 is a block diagram of still another device for establishing a wireless connection, consistent with embodiments of the present disclosure.

FIG. 6 is a block diagram of a device 600 for establishing a wireless connection, according to an exemplary embodiment. For example, the device 600 may be a smart terminal, such as the smart terminal 32 shown in FIG. 3. Referring to FIG. 6, the device 600 includes a monitoring module 601, an analysis module 602, and a connection module 603.

The monitoring module 601 is coupled with the analysis module 602, and is configured to monitor a plurality of wireless working frequency bands supported by a smart terminal. The analysis module 602 is coupled with the connection module 603, and is configured to, when a P2P data packet is received at any wireless working frequency band, analyze the P2P data packet to obtain device information of a smart device. The connection module 603 is configured to establish a wireless connection with the smart device at the wireless working frequency band according to the device information.

In some embodiments, the connection module 603 is configured to add the smart device into a P2P device list according to the device information of the smart device. The connection module 603 is further configured to, when an operation to connect to the smart device is detected, establish the wireless connection with the smart device at the wireless working frequency band according to the device information.

In some embodiments, the monitoring module 601 is configured to, when an operation for turning on a P2P discovery function is detected, acquire a wireless frequency band list, which includes a plurality of wireless working frequency bands supported by the smart terminal. The monitoring module 601 is further configured to monitor each wireless working frequency band in the wireless frequency band list to acquire the P2P data packet.

In some embodiments, the analysis module 602 is further configured to analyze the P2P data packet and obtain identification information of a P2P group. The connection module 603 is further configured to, when the operation to connect to the smart device is detected, join the P2P group according to the device information and the identification information of the P2P group.

In the illustrated embodiment, a plurality of wireless working frequency bands supported by the smart terminal are monitored. When a P2P data packet is received at any wireless working frequency band, the P2P data packet is analyzed to obtain the device information of the smart device. The wireless connection is established between the smart device and the smart terminal at the wireless working frequency band according to the device information. The smart terminal may monitor all of its supported wireless working frequency bands to detect the P2P data packet and establish the wireless connection with the smart device at the wireless working frequency band at which the P2P data packet sent by the smart device is received. The smart device does not have to frequently switch among channels 1, 6, and 11 for broadcasting. This reduces impacts of broadcasting the P2P data packet on normal use of the other WiFi services.

With respect to the devices in the above embodiments, the specific manners individual modules performs operations have been described in detail in the embodiments regarding the methods, which will not be elaborated herein.

Figure 7:
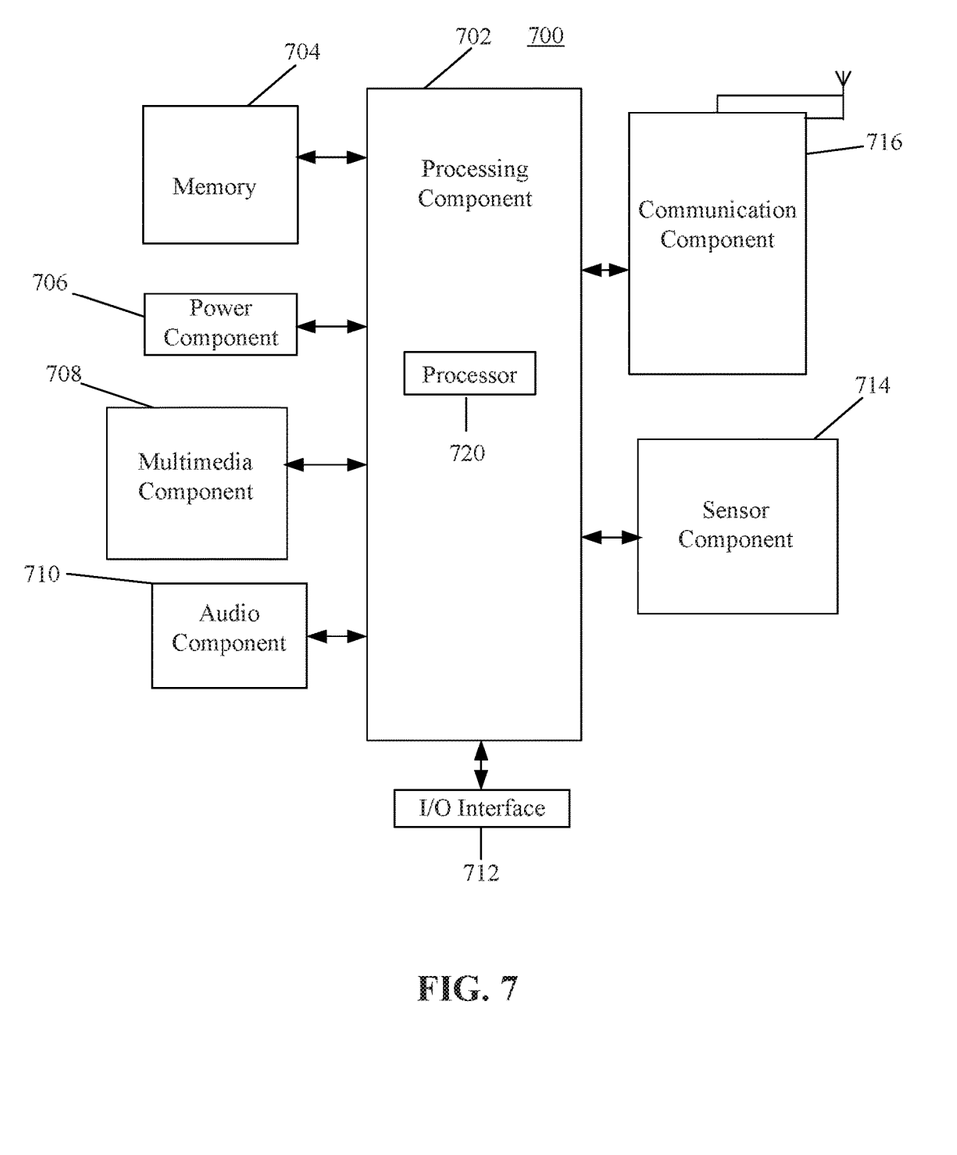
FIG. 7 is a block diagram of yet another device for establishing a wireless connection, consistent with embodiments of the present disclosure.

FIG. 7 is a block diagram of a device 700 for establishing a wireless connection, according to an exemplary embodiment. For example, the device 700 may be the smart device 30 or the smart terminal 32 shown in FIG. 3. The device 700 may be a mobile phone, a computer, a digital broadcast terminal, a messaging device, a gaming console, a tablet, a medical device, fitness equipment, a Personal Digital Assistant (PDA), a television, and the like.

Referring to FIG. 7, the device 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the abovementioned methods. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the device 700. Examples of such data include instructions for any application programs or methods operated on the device 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the device 700. The power component 706 may include a power management system, one or more power supplies, and other components associated with the generation, management and distribution of power for the device 700.

The multimedia component 708 includes a screen providing an output interface between the device 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the device 700 is in the operation mode, such as a call mode, a recording mode and a voice recognition mode. The received audio signal may be further stored in the memory 704 or sent through the communication component 716. In some embodiments, the audio component 710 further includes a speaker configured to output the audio signal.

The I/O interface 712 provides an interface between the processing component 702 and a peripheral interface module, and the peripheral interface module may be a keyboard, a click wheel, a button and the like. The button may include, but not limited to: a home button, a volume button, a starting button and a locking button.

The sensor component 714 includes one or more sensors configured to provide status assessment in various aspects for the device 700. For instance, the sensor component 714 may detect an on/off status of the device 700 and relative positioning of components, such as a display and small keyboard of the device 700, and the sensor component 714 may further detect a change in a position of the device 700 or a component of the device 700, presence or absence of contact between the user and the device 700, orientation or acceleration/deceleration of the device 700 and a change in temperature of the device 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the device 700 and another device. The device 700 may access a communication-standard-based wireless network, such as a WiFi network, a 2nd-Generation (2G), 3rd-Generation (3G), or 4th-Generation (4G) network or a combination thereof. In an exemplary embodiment, the communication component 716 receives a broadcast signal or broadcast associated information from an external broadcast management system through a broadcast channel. In an exemplary embodiment, the communication component 716 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned methods for establishing a wireless connection.

In an exemplary embodiment, there is also provided a non-transitory computer-readable storage medium including instructions, such as the memory 704 storing instructions, and the instructions may be executed by the processor 720 of the device 700 to implement the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, there is also provided a non-transitory computer-readable storage medium storing instructions. The instructions in the storage medium are executed by a processor of a mobile terminal to enable the mobile terminal to execute the above described methods for establishing a wireless connection.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for establishing a wireless connection, comprising:

monitoring, by a smart terminal, a plurality of wireless working frequency bands supported by the smart terminal;

when a Peer to Peer (P2P) data packet broadcasted by a smart device is received at a wireless working frequency band of the plurality of wireless working frequency bands, analyzing, by the smart terminal, the P2P data packet and obtaining device information of the smart device;

establishing, by the smart terminal according to the device information, a wireless connection with the smart device at the wireless working frequency band at which the P2P data packet is received;

analyzing, by the smart terminal, the P2P data packet and obtaining identification information of a P2P group; and when the operation to connect to the smart device is detected, joining, by the smart terminal, the P2P group according to the device information and the identification information of the P2P group, wherein the smart terminal is a terminal supporting a Wireless Fidelity Peer to Peer (WiFi P2P) protocol, and the smart device is a device supporting the WiFi P2P protocol.

2. The method according to claim 1, further comprising:
adding, by the smart terminal, the smart device into a P2P device list according to the device information; and
when an operation to connect to the smart device is detected, establishing, by the smart terminal according to the device information, the wireless connection with the smart device at the wireless working frequency band at which the P2P data packet is received.

3. The method according to claim 1, wherein monitoring the plurality of wireless working frequency bands supported by the smart terminal comprises:
when an operation for turning on a P2P discovery function is detected, acquiring, by the smart terminal, a wireless frequency band list, the wireless frequency band list including the plurality of wireless working frequency bands supported by the smart terminal; and
monitoring, by the smart terminal, each of the wireless working frequency bands in the wireless frequency band list to acquire the P2P data packet.

4. A smart terminal, comprising:
a processor; and
a memory configured to store instructions executable by the processor,
wherein the processor is configured:
monitor a plurality of wireless working frequency bands supported by the smart terminal;
when a Peer to Peer (P2P) data packet broadcasted by a smart device is received at a wireless working frequency band of the plurality of wireless working frequency bands, analyze the P2P data packet and obtain device information of the smart device;

establish, according to the device information, a wireless connection with the smart device at the wireless working frequency band at which the P2P data packet is received;

analyze the P2P data packet and obtain identification information of a P2P group; and when the operation to connect to the smart device is detected, join the P2P group according to the device information and the identification information of the P2P group, wherein the smart terminal is a terminal supporting a Wireless Fidelity Peer to Peer (WiFi P2P) protocol, and the smart device is a device supporting the WiFi P2P protocol.

5. The smart terminal according to claim 4, wherein the processor is further configured to:

add the smart device into a P2P device list according to the device information; and when an operation to connect to the smart device is detected, establish, according to the device information, the wireless connection with the smart device at the wireless working frequency band at which the P2P data packet is received.

6. The smart terminal according to claim 4, wherein the processor is further configured to:

when an operation for turning on a P2P discovery function is detected, acquire a wireless frequency band list, the wireless frequency band list including the plurality of wireless working frequency bands supported by the smart terminal; and monitor each of the wireless working frequency bands in the wireless frequency band list to acquire the P2P data packet.

7. A non-transitory computer-readable storage medium having stored therein instructions that, when executed by a processor of a smart terminal, cause the smart terminal to perform a method for establishing a wireless connection, the method comprising:

monitoring a plurality of wireless working frequency bands supported by the smart terminal;

when a Peer to Peer (P2P) data packet broadcasted by a smart device is received at a wireless working frequency band of the plurality of wireless working frequency bands, analyzing the P2P data packet and obtaining device information of the smart device;

establishing, according to the device information, a wireless connection with the smart device at the wireless working frequency band at which the P2P data packet is received;

analyzing the P2P data packet and obtaining identification information of a P2P group; and when the operation to connect to the smart device is detected, joining the P2P group according to the device information and the identification information of the P2P group, wherein the smart terminal is a terminal supporting a Wireless Fidelity Peer to Peer (WiFi P2P) protocol, and the smart device is a device supporting the WiFi P2P protocol.

* * * * *